(12) United States Patent
Echigo et al.

(10) Patent No.: US 7,490,342 B2
(45) Date of Patent: Feb. 10, 2009

(54) CONTENT PROVISIONING SYSTEM AND METHOD

(75) Inventors: Tomio Echigo, Kawasaki (JP); Ken Masumitsu, Yamato (JP); Masayoshi Teraguchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1221 days.

(21) Appl. No.: 10/412,819

(22) Filed: Apr. 10, 2003

(65) Prior Publication Data

US 2003/0217091 A1 Nov. 20, 2003

(30) Foreign Application Priority Data

May 14, 2002 (JP) ............................. 2002-138969

(51) Int. Cl.
*H04N 5/445* (2006.01)
(52) U.S. Cl. ............................. 725/46; 725/120; 725/34
(58) Field of Classification Search ................. 725/120, 725/46, 34
See application file for complete search history.

(56) References Cited

U.S. PATENT DOCUMENTS

2002/0112244 A1* 8/2002 Liou et al. ..................... 725/93
2003/0093790 A1* 5/2003 Logan et al. .................. 725/38
2005/0172318 A1* 8/2005 Dudkiewicz et al. .......... 725/46

FOREIGN PATENT DOCUMENTS

JP 2002-138969 5/2002

OTHER PUBLICATIONS

"An Architecture for Differentiated Services," Request for Comments 2475, Dec. 1998, S. Blake, D. Black, M. Carlson, E. Davies, Z. Wang and W. Weiss.
"Two-Layer Coding of Video Signals for VBR Networks," IEEE Journal on Selected Areas in Communications, vol. 7, No. 5, pp. 771-781, Jun. 1989.
"A Prototype of Digest Making Method Using the Program Index," DEWS99, 6A-2, Mar. 1999, Hashimoto, Shirota, Kuboki, Kuneida, Iizawa.
"Dynamic Program Generation and Delivery Using Live Video Stream With Index" Information Processing Society of Japan, vol. 41, No. SIGI (TOD5), pp. 87-99, Feb. 2000.

* cited by examiner

*Primary Examiner*—John W Miller
*Assistant Examiner*—Sumaiya A Chowdhury
(74) *Attorney, Agent, or Firm*—Douglas W. Cameron; Anne Vachon Dougherty

(57) ABSTRACT

To implement more appropriate QoS control by compressing contents data distributed via a network taking into consideration meaning of contents and preferences of users.

A network system comprises a content provider that provides content and client that acquires the content. The content provider attaches information on communication priorities to the content based on the content's importance which is determined from the meaning of the content's and sends the content to the client using a protocol which controls quality of service based on the priority and the client receives the content transmitted by the content provider.

3 Claims, 17 Drawing Sheets

[Figure 1]
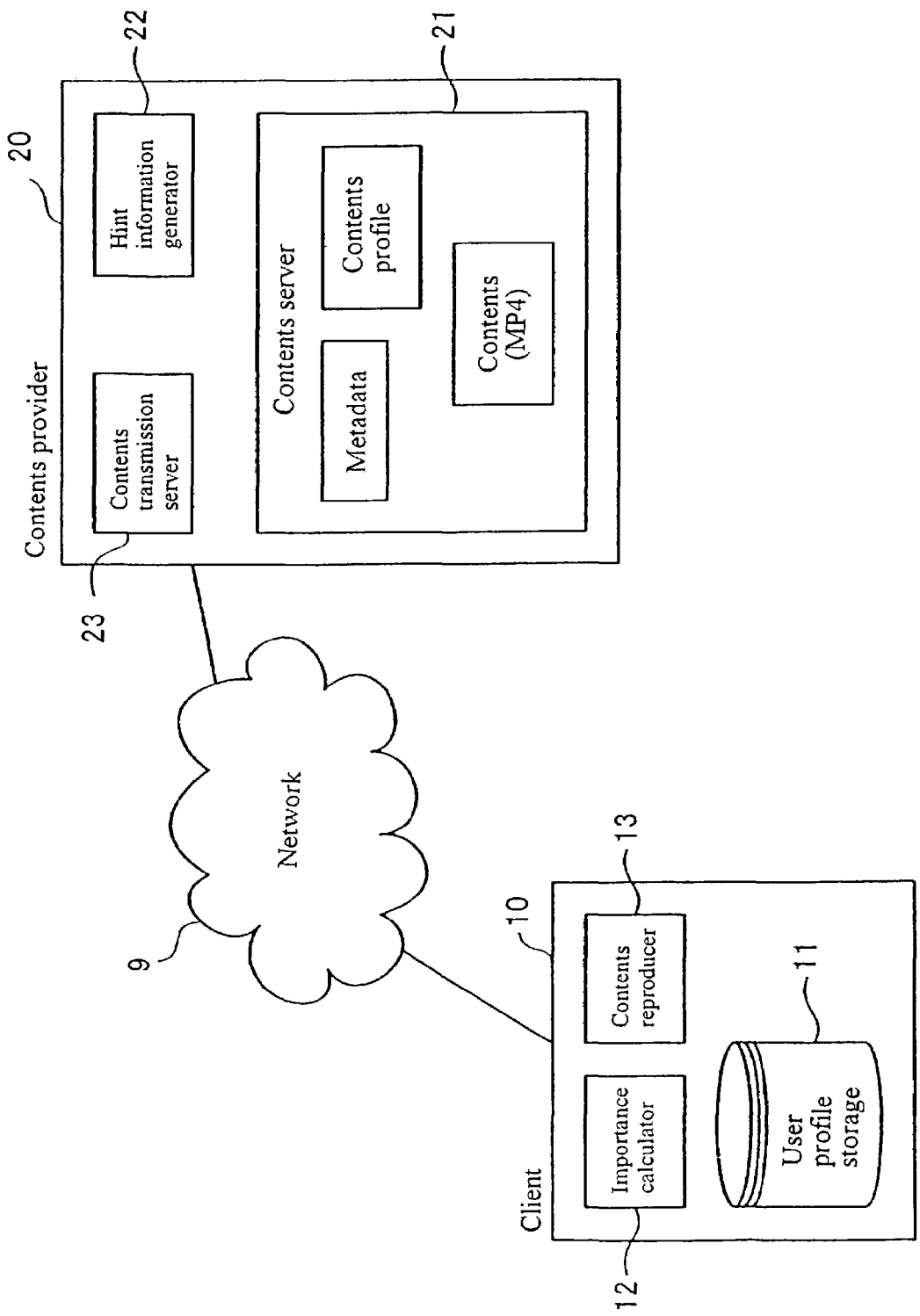

[Figure 2]
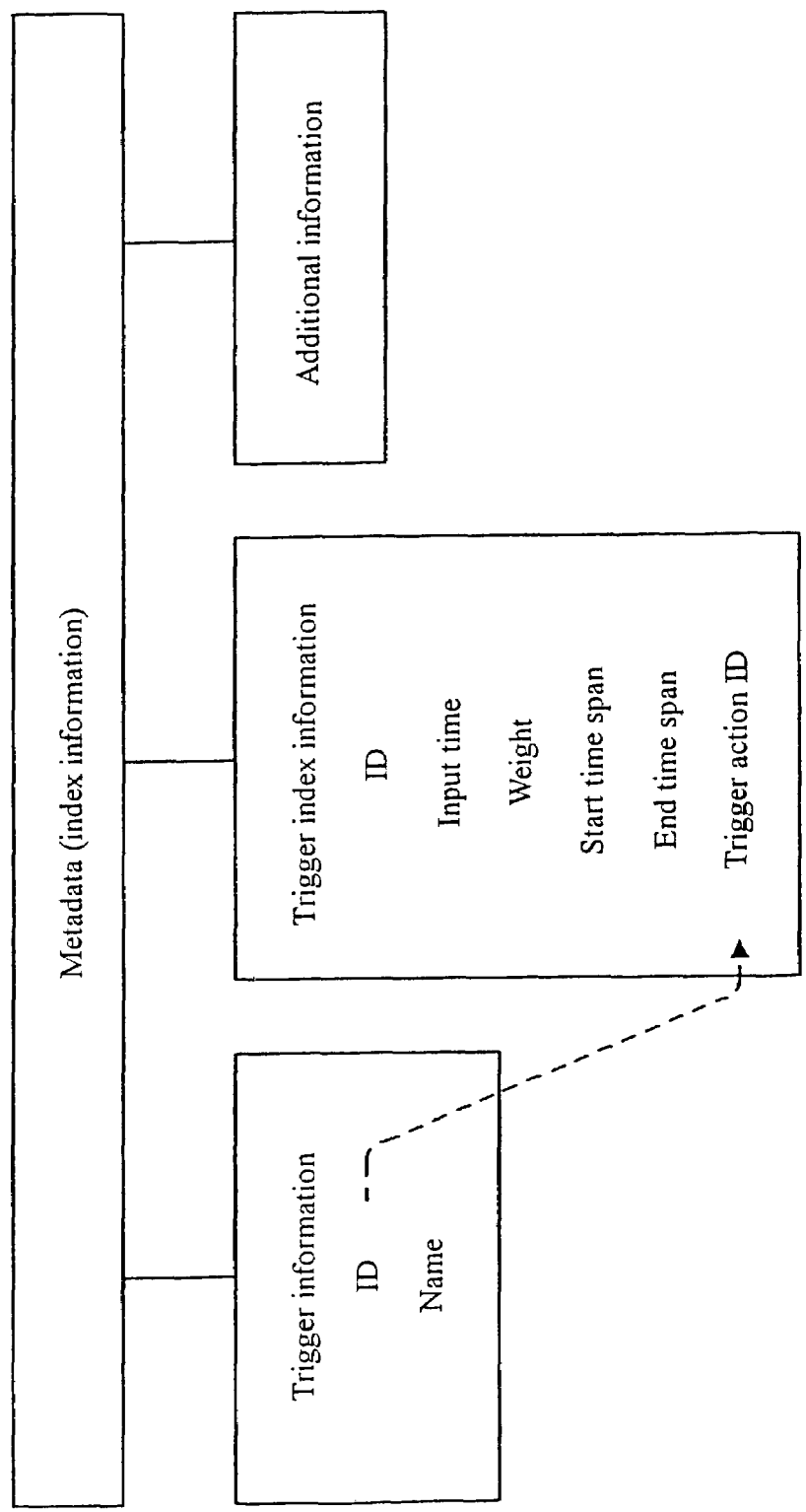

[Figure 3]
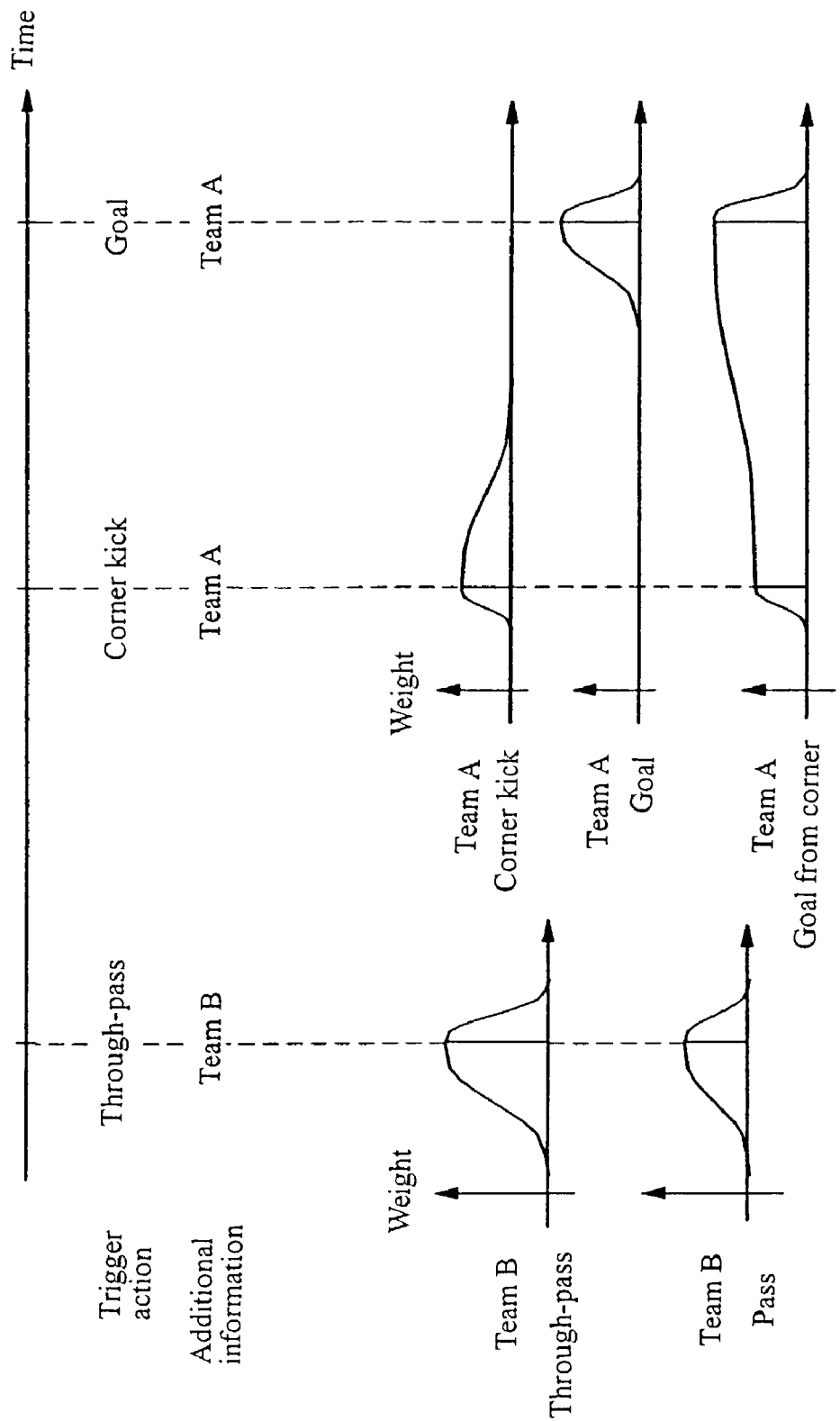

[Figure 4]

| Contents profile | |
|---|---|
| Team name | Event |
| Team B | Pass = 0.1 |
| Team A | Corner kick = 0.4 |
| Team A | Goal = 0.8 |
| . . . . . . | |

[Figure 5]

| User profile | |
|---|---|
| Team name | Event |
| Team B | Pass = 0.0 |
| Team A | Corner kick = 0.6 |
| Team A | Goal = 0.9 |
| . . . . . . | |

[Figure 6]

| | Contents profile | User profile | Profile |
|---|---|---|---|
| $f_2(t)$ Team B Through-pass | 0.4 | 0.8 | 0.6 |
| $f_1(t)$ Team B Pass | 0.1 | 0.0 | 0.05 |
| $f_3(t)$ Team A Corner kick | 0.4 | 0.6 | 0.5 |
| $f_5(t)$ Team A Goal | 0.8 | 0.9 | 0.85 |
| $f_4(t)$ Team A Goal from corner | 0.9 | 0.9 | 0.9 |

[Figure 7]
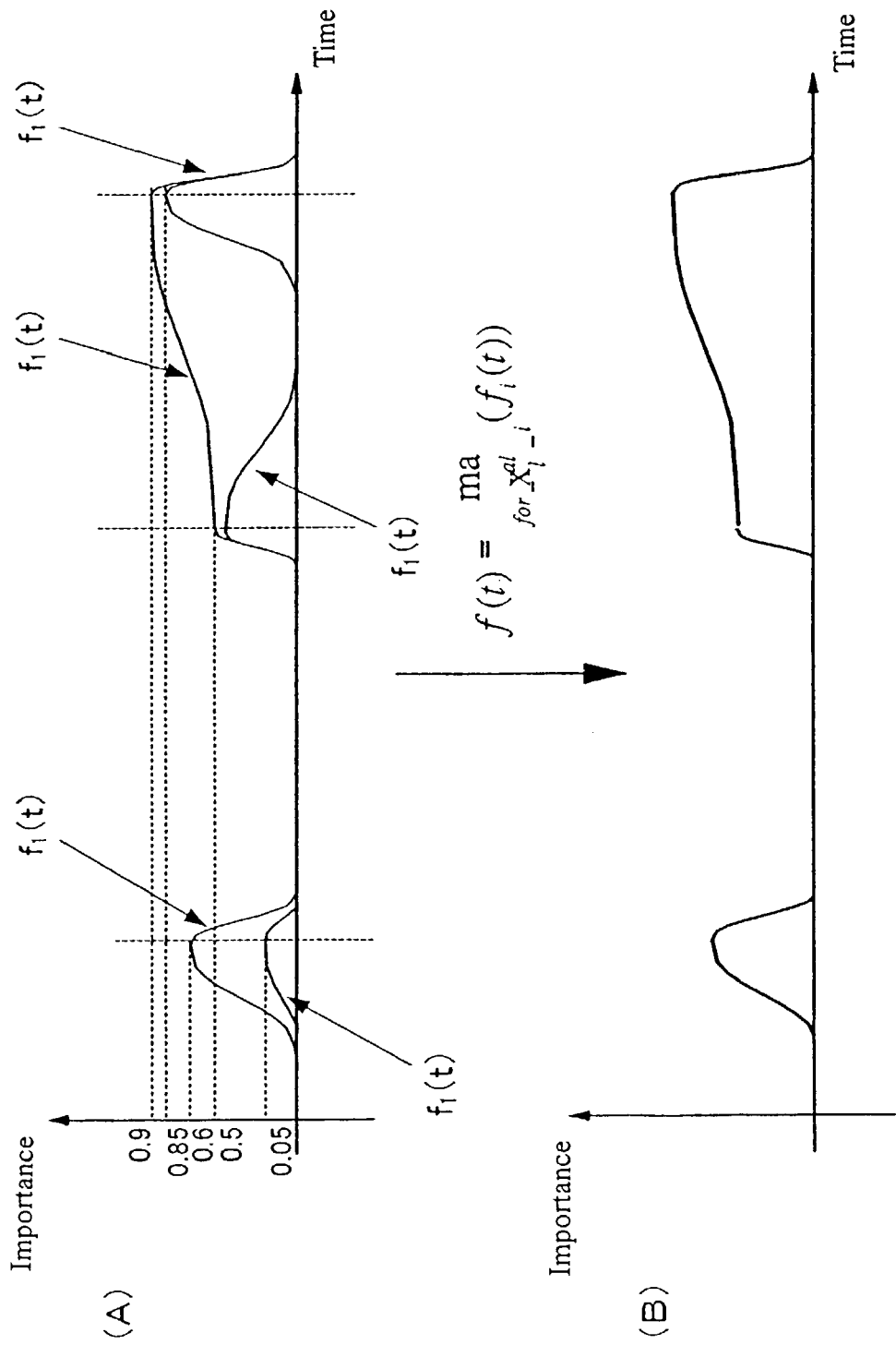

[Figure 8]
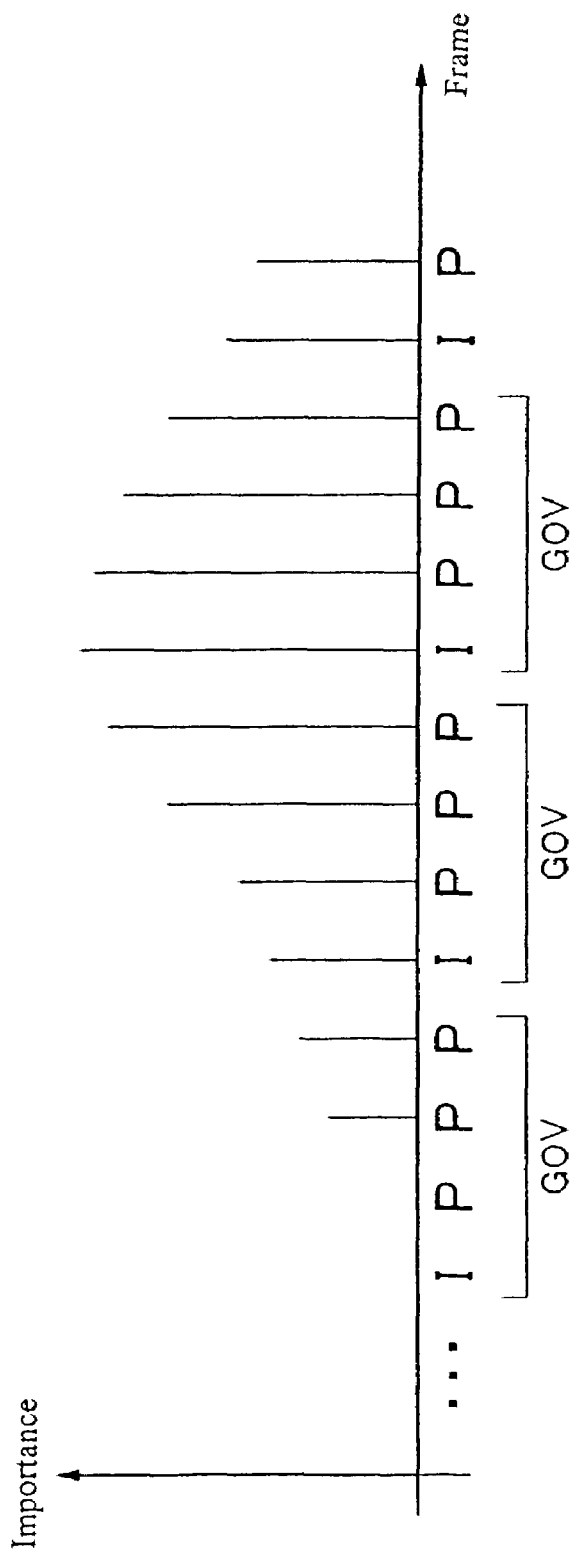

[Figure 9]
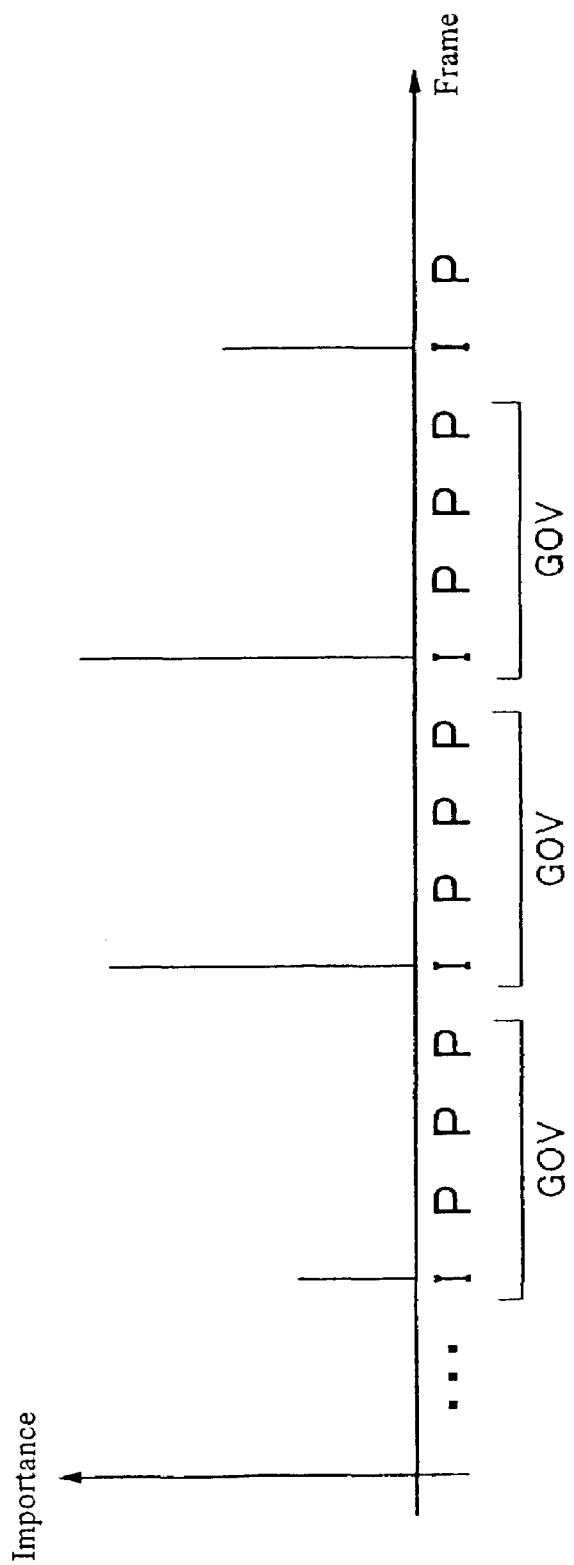

[Figure 10]
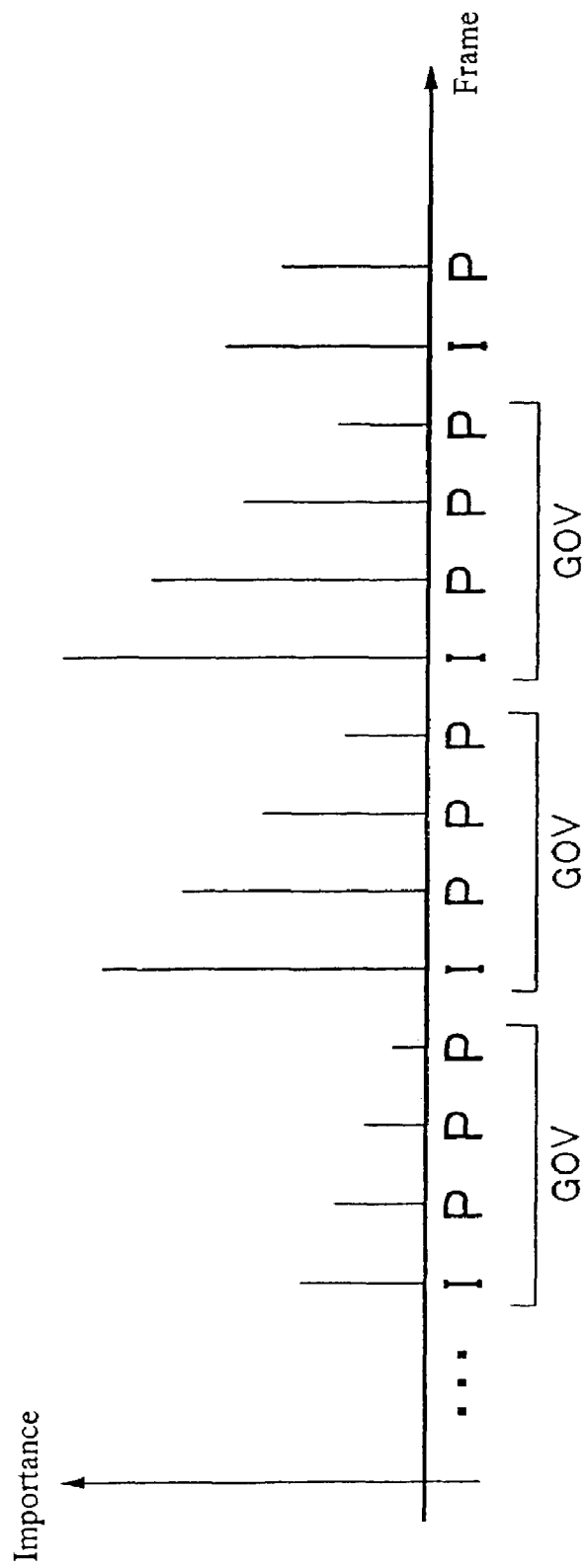

[Figure 11]
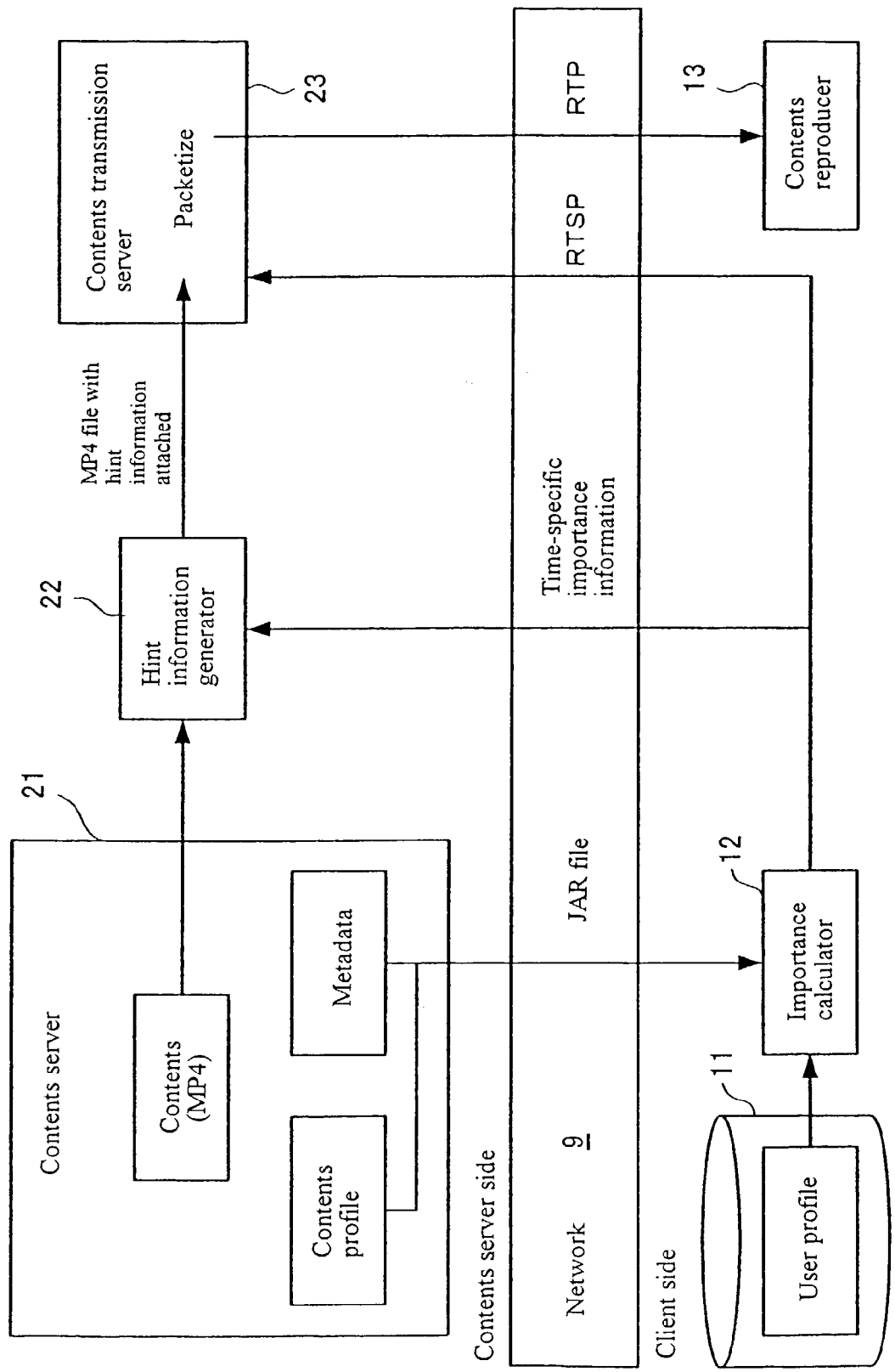

[Figure 12]
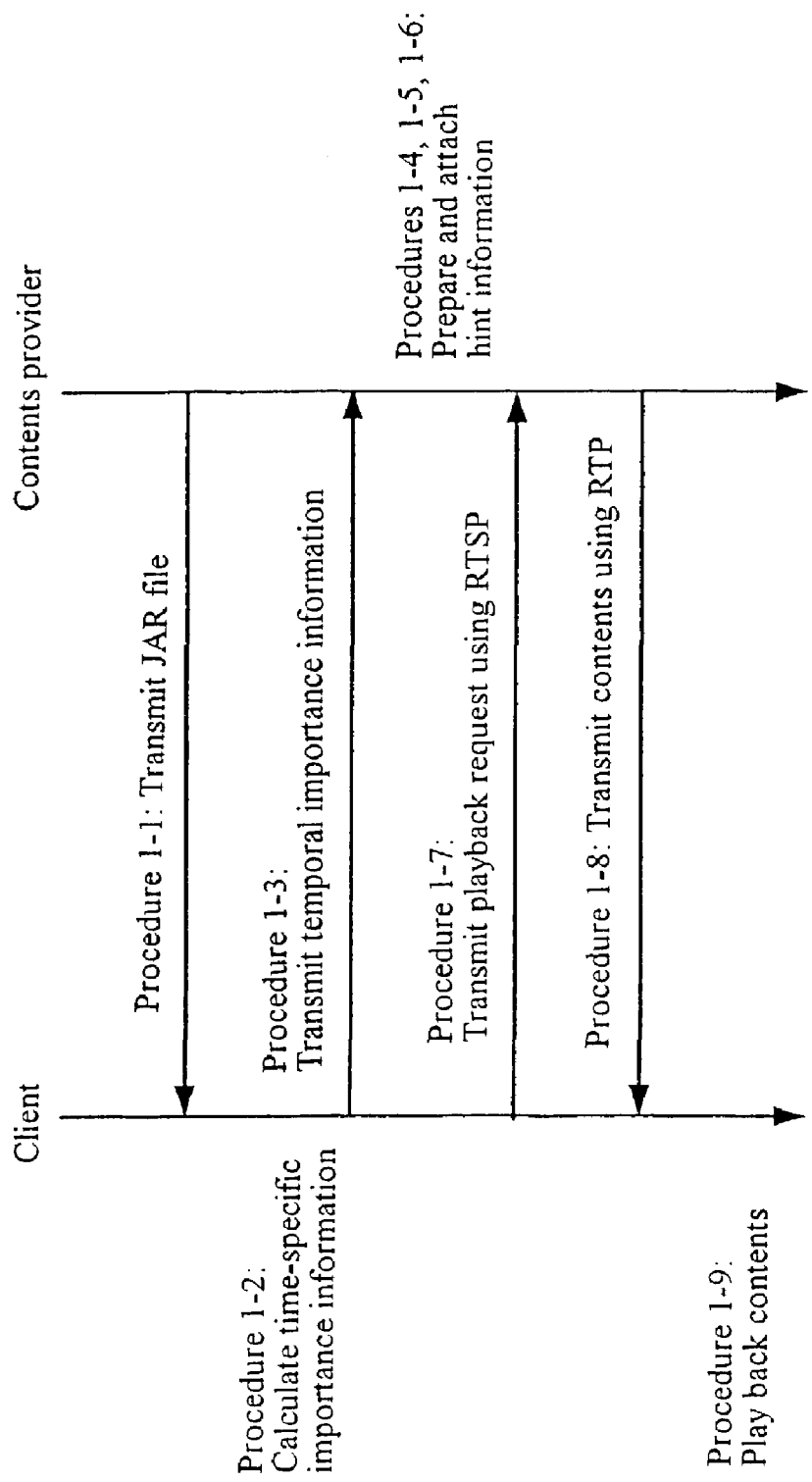

[Figure 13]
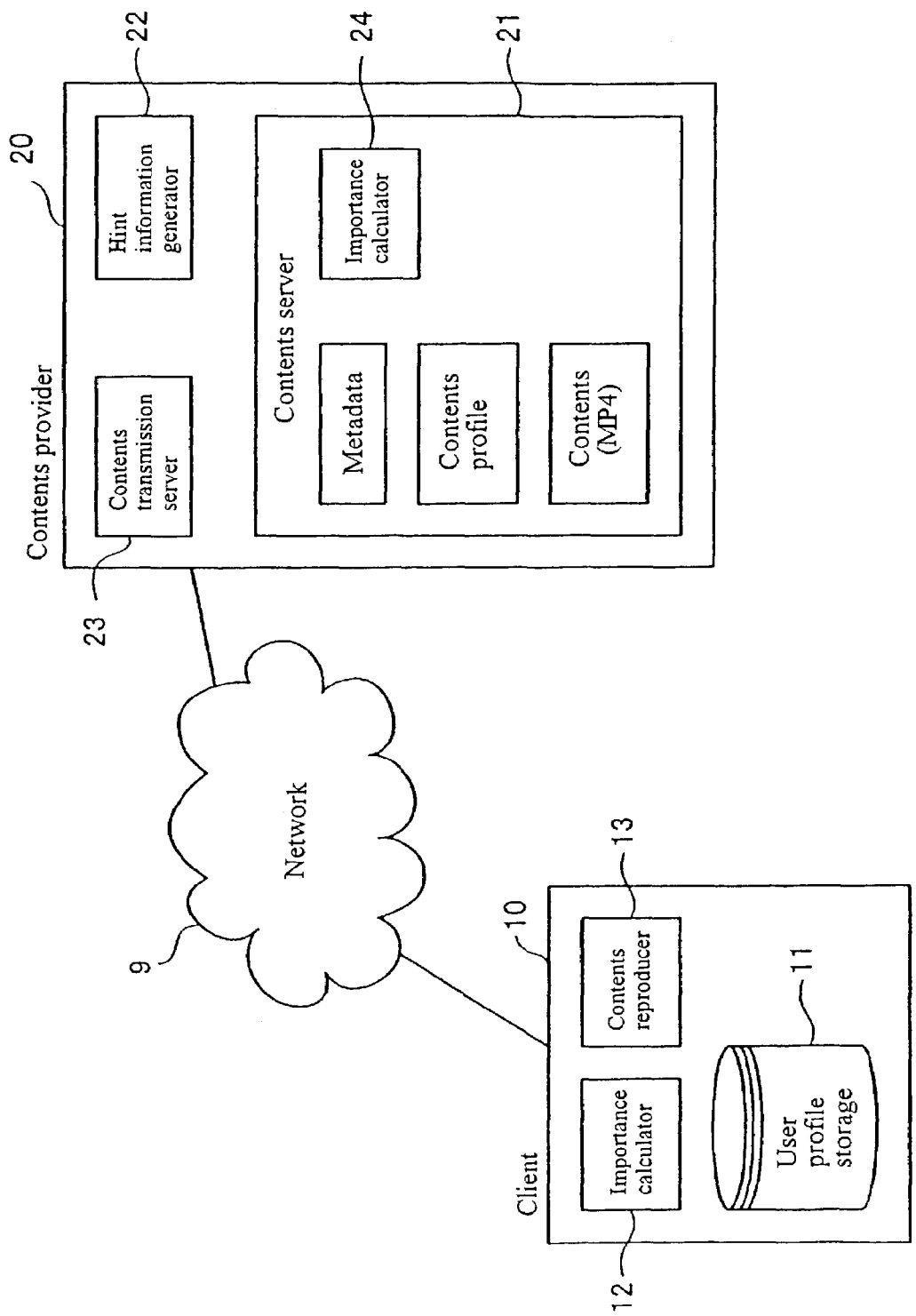

[Figure 14]
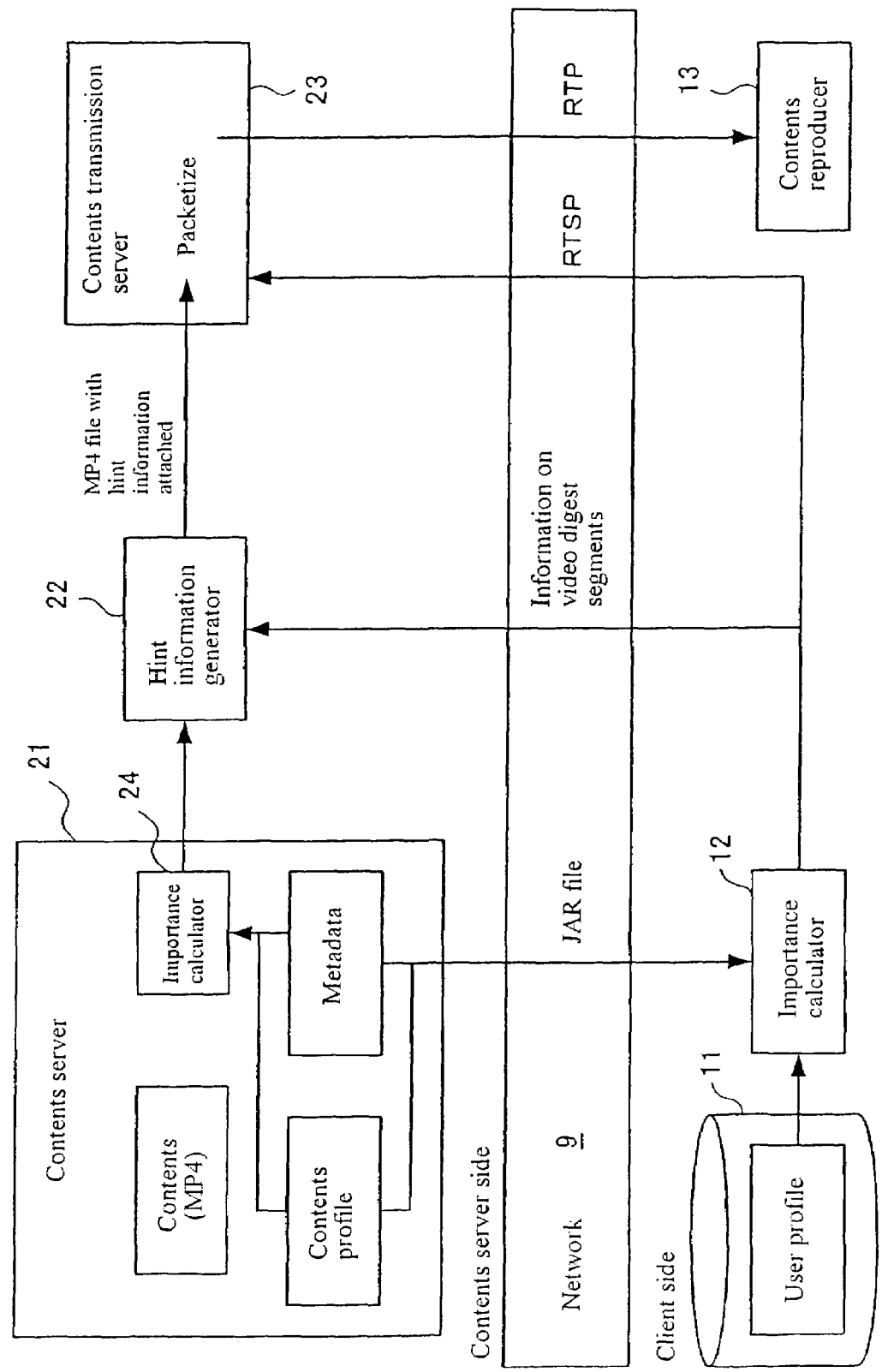

[Figure 15]
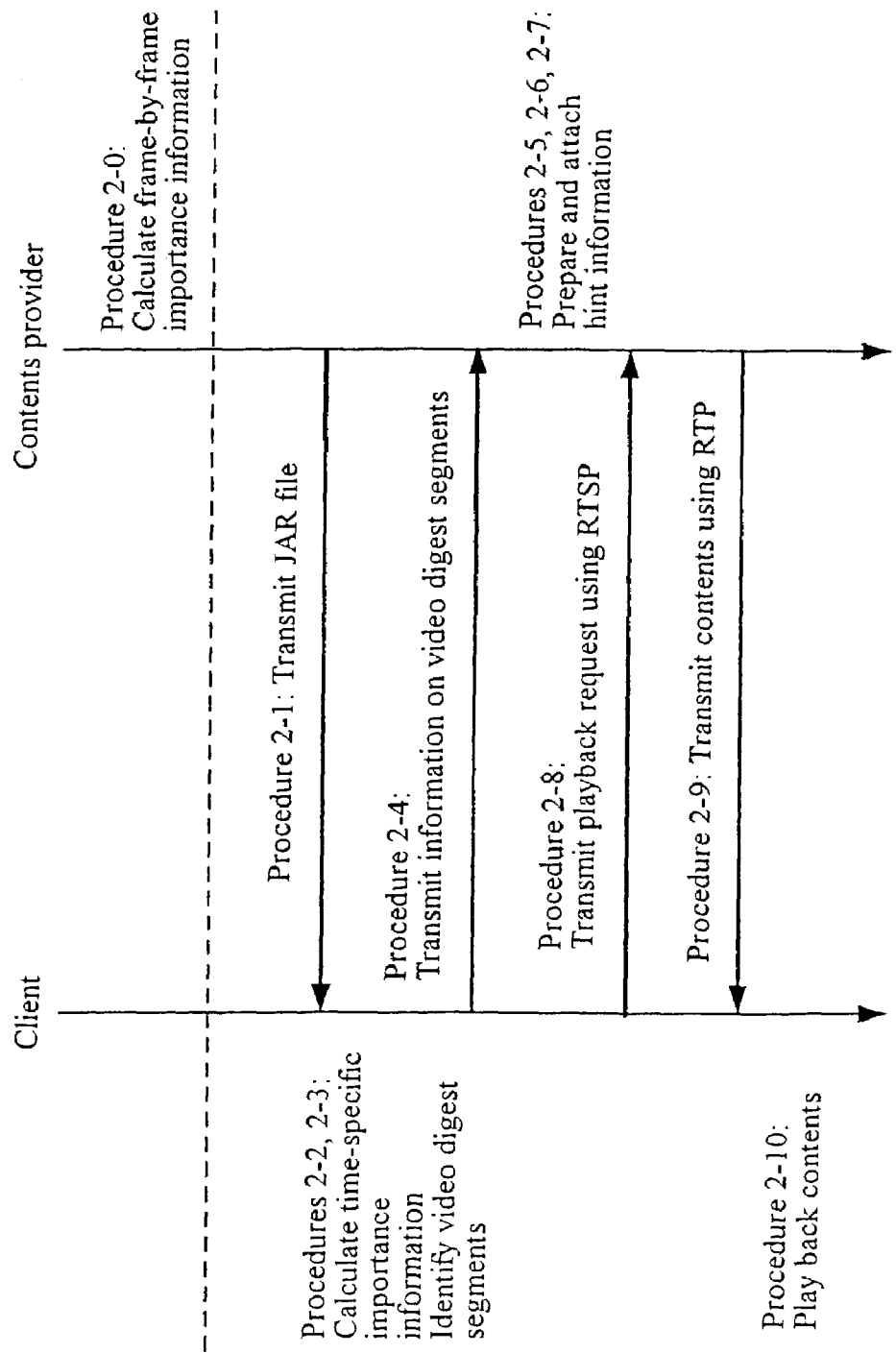

[Figure 16]
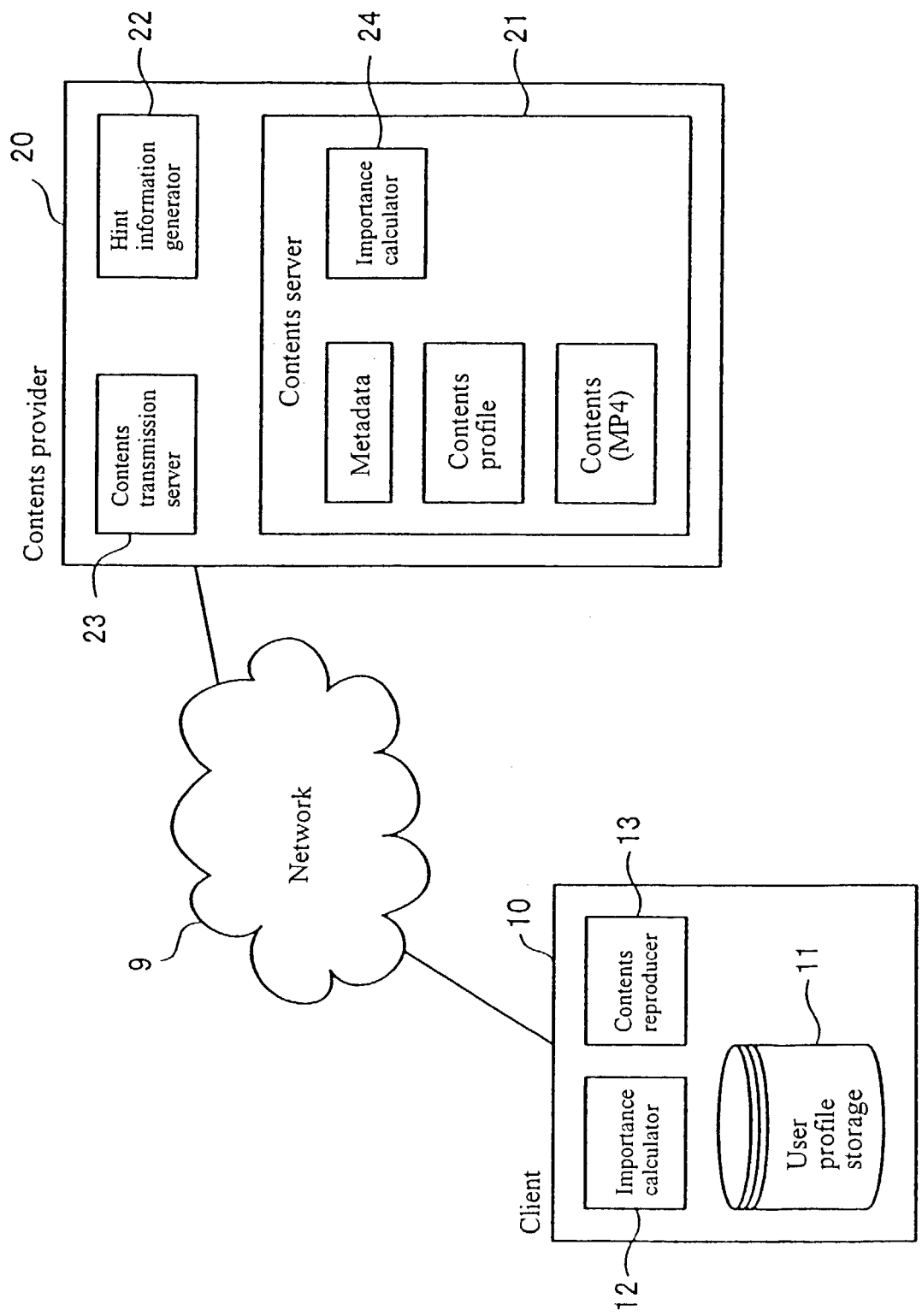

[Figure 17]
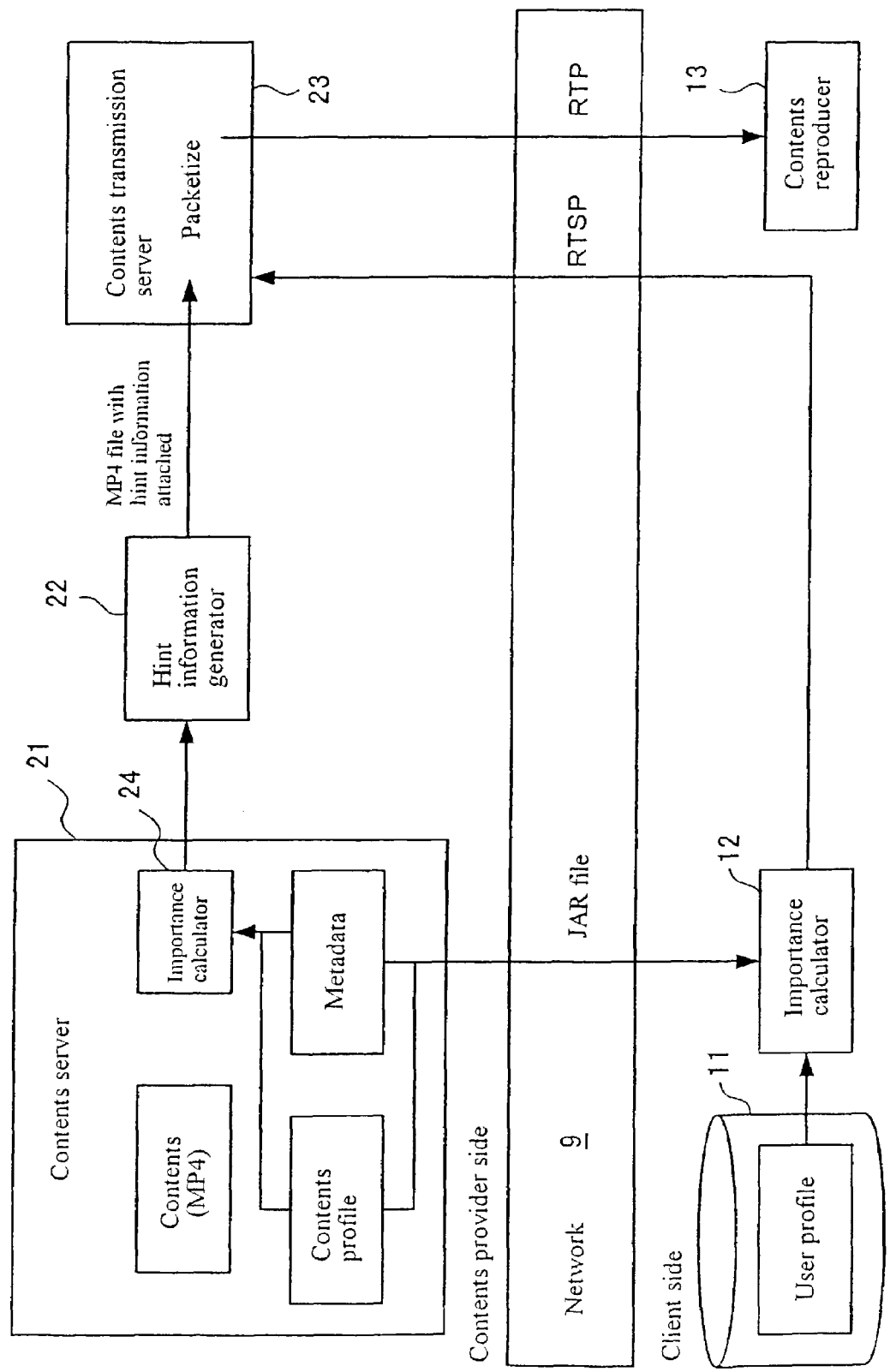

[Figure 18]
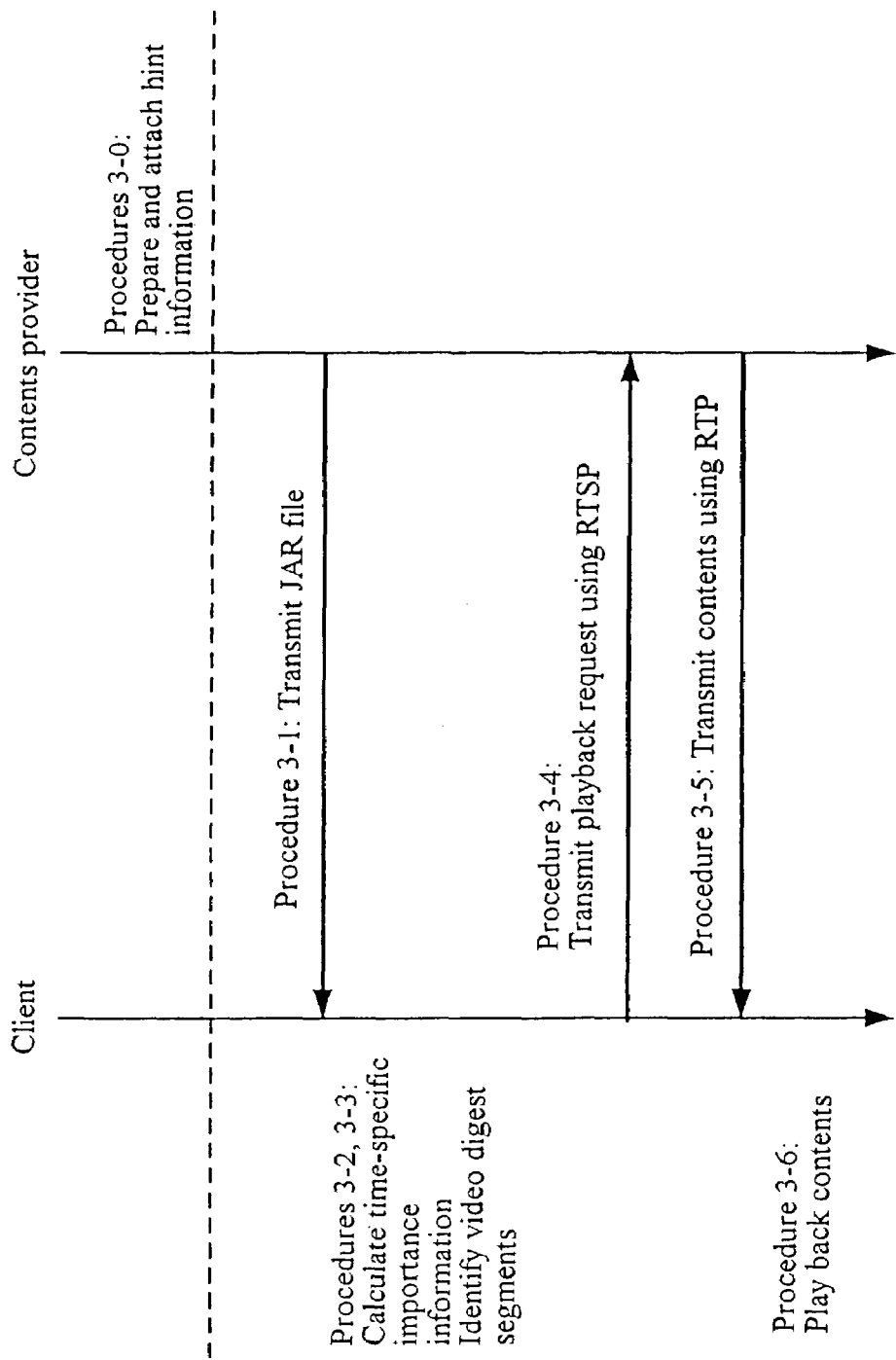

CONTENT PROVISIONING SYSTEM AND METHOD

DETAILED DESCRIPTION OF THE INVENTION

1. Field of the Invention

The present invention relates to contents providing technology for providing contents such as video to clients. More particularly, it relates to technology for controlling the quality of contents dynamically according to network traffic.

2. Background Art

Recently, with the widespread popularity of the Internet, computer networks have been growing explosively and various Internet-based services have been implemented. However, conventional Internet communications services based on packet-switching are provided on a best effort basis and they do not guarantee end-to-end quality, although they make effective use of unused bandwidth by means of statistical multiplexing. Therefore, if network traffic is congested, the quality of service (QoS) in the network may be lowered without bounds.

With the advancement of digital terrestrial broadcasting and commencement of IMT-2000 (International Mobile Telecommunications 2000) services, it is expected that services will be more diversified in the future. Portable terminals, as typified by cell phones and PDAs, in particular, will increase available bandwidth up to 2 Mbps, so that contents providers would be encouraged to flexibly distribute multimedia contents. In order to provide contents of a quality that satisfy users in contents distribution over the Internet, it is important to guarantee QoS. As a technology for assuring QoS, a protocol called Differentiated Service (DiffServ) has been proposed. DiffServ is disclosed in detail, for example, in document 1 described below.

Document 1: S. Blake, D. Black, M. Carlson, E. Davies, Z. Wang, and W. Weiss, "An Architecture for Differentiated Services," Request for Comments 2475, December 1998.

Unlike conventional QoS approaches which carry out calculations based on logical worst-case values, DiffServ is designed to be scalable and in compliance with a business model of an Internet service provider (ISP) through a realistic approach which does not need close control using broadband lines or higher-function end systems. DiffServ can organize traffic flowing in a network into routes called "pipes." Services of different qualities, divided into classes, are provided through different pipes. The types of pipe include Assured-Forwarding (AF) which guarantees a minimum bandwidth available for priority packets, Expedited-Forwarding (EF) which can be used as virtual private lines by assuring the upper limit of bandwidth available for priority packets, etc. DiffServ is equipped with a mechanism for assigning priorities to packets and can change the quality of services provided to users, by combining this mechanism with pipes properly.

Video streaming will be considered here as an example of contents distribution using such a technology for guaranteeing QoS as the one described above.

When sufficient bandwidth is assured, it is possible to distribute video of the quality desired by the user. However, as the traffic on the network increases, the bandwidth allocated to individual communications becomes limited, and not all video data can be transmitted, thus making degradation of video quality unavoidable. Consequently, it is necessary to distribute important data preferentially by assigning priorities to video data. Methods for assigning priorities to video data include a technology—disclosed in document 2 described below—for assigning priorities based on the principle that when image elements undergo frequency decomposition, important image elements are polarized on the low-frequency side, a technology for raising the priority of I-frames by taking notice of relationship among I-frames, P-frames, and B-frames in MPEG (Moving Picture Experts Group) images, and other technologies Document 2: M. Ghanbari, "Two-Layer Coding of Video Signals for VBR Networks," IEEE Journal on Selected Areas in Communications, Vol. 7, No. 5, pp. 771-781, June 1989.

On the other hand, there are conventional technologies for generating a video digest by extracting images desired by users from contents according to tastes and preferences of the users. These technologies are disclosed, for example, in documents 3 and 4.

Document 3: Hashimoto, Shirota, Kuboki, Kunieda, Iizawa, "A Prototype of Digest Making Method Using the Program Index," DEWS99, 6A-2, March 1999.

Document 4: Kakutani, Kawaguchi, Doi, Akasako, Tanaka, "Dynamic Program Generation and Distribution by Means of Indexed Live Video Streams," Journal of Information Processing Society of Japan, Vol. 41, No. SIG1 (TOD5), pp. 87-99, February 2000.

[Problems to be Solved by the Invention]

As described above, in contents distribution which handles large volumes of data such as multimedia contents, it is important to implement QoS control (media QoS control) in order to maintain audience (user) satisfaction by reducing the effect of variations in data transfer capacity caused by network congestion or unstable connections. Possible methods for implementing this approach include a technique which involves attaching additional data about priority to data and discarding data according to this priority, depending on available data transfer capacity, as with the conventional technology described in document 2 above. In this case, however, criteria for priority-setting become a problem.

Multimedia contents consist mainly of audio and video. Therefore, conventional technologies of this type generally set priorities based on characteristics of audio signals and video signals, as in the case of the technologies described in documents 1 and 2 above. If priorities are set based only on signal characteristics, when data is discarded as a result of variations in the state of communications, quality will be lowered uniformly over the entire audio and video.

However, some contents contain those parts which the user wants to enjoy with high quality and other parts. In such a case, it may not be desirable to lower the quality of those parts which the user wants to enjoy with high quality.

Depending on contents, if quality is lowered uniformly, dynamic scenes may not be viewable while static scenes remain viewable.

If a problem such as the one described above occurs with cell-phone-based contents distribution, which mainly employs a usage-based tariff system, contents are not received properly although fees are charged, resulting in increased user dissatisfaction.

To avoid the above problems, it is necessary to implement media QoS control based on meaning of contents: assigning high priorities to important parts of contents, discarding data in a discriminatory manner, and thereby reducing quality degradation of the important parts.

However, as described above, conventional media QoS control, which does not set priorities of video with consideration of meaning of contents, cannot discard data in such a manner.

Also, the conventional technologies—disclosed in documents 3 and 4—for generating a video digest by extracting video desired by users from contents according to tastes and preferences of the users do not take into consideration QoS guarantees which are needed when distributing the generated video digest over the Internet.

Thus, an object of the present invention is to implement more appropriate QoS control by taking meaning of contents into consideration when discarding data distributed in contents distribution on a network.

Another object of the present invention is to implement QoS control which accommodates contents users individually by taking contents users' demands into consideration when discarding distributed data.

SUMMARY OF THE INVENTION

To achieve the above objects, an embodiment of the present invention is implemented as a network system comprising a contents provider that provides contents and a client that acquires the contents, wherein: the contents provider attaches information on communication priorities to the contents based on importance which is determined from the meaning of the contents and sends the contents to the client using a protocol which controls quality of service based on the priorities; and the client receives the contents transmitted by the contents provider.

Specifically, the importance of the contents is calculated based on metadata which describes information on the contents and profiles which describe values relating to the importance of the contents corresponding to the metadata.

More specifically, the profiles include a contents profile in which values are specified according to meaning of the contents and a user profile in which values are specified individually according to user preferences.

More preferably, in the network system: the contents provider supplies metadata and a contents profile to the client; and the client calculates the importance of the contents based on the metadata and the contents profile as well as on a user profile in its possession, and transmits the calculated importance to the contents provider.

Also, to achieve the above objects, another embodiment of the present invention is implemented as a contents providing system which provides contents to a client via a network, comprising: an information attaching unit for generating information on communication priorities based on the contents' importance which is determined from the meaning of the contents and attaching it to the contents; and a transmission control unit for sending the contents to the client, with the information on priorities attached, using a protocol which controls quality of service in priority order established by dividing communications into classes.

Specifically, the information attaching unit generates the information on priorities based on the importance received from the client to which the contents are transmitted.

Alternatively, the contents providing system further comprises an importance calculating unit for calculating the importance based on metadata and a contents profile, wherein the information attaching unit generates the information on priorities based on the importance calculated by the importance calculating unit.

Furthermore, if the contents are video contents, the information attaching unit generates information on priority for each frame in the video contents according to scenes in the video contents.

More preferably, the information attaching unit writes the information on priority into an area for additional information in a compressed video file which is the video contents. Specifically, if an MP4 file compliant with the MPEG-4 file format is used as the compressed video file, the information on priority is written as hint information into a hint track of the MP4 file.

Also, to achieve the above objects, the present invention is implemented as a terminal device which acquires contents via a network, comprising: a calculating unit for calculating importance used for controlling quality of service (QoS) when acquiring the contents, based on metadata which describes information on contents to acquire and profiles which describe values relating to the importance of the contents corresponding to the metadata; and a data transmission unit for transmitting the importance calculated and a request for the contents to a contents provider which provides the contents.

Specifically, the calculating unit calculates importance using a contents profile acquired from the contents provider and a user profile held in the terminal device.

Also, the present invention is implemented as a contents transmission method for controlling a computer connected to a network to transmit contents, comprising the steps of: generating information on communication priorities based on the contents' importance which is determined from the meaning of the contents and attaching it to the contents; and transmitting said contents, with said information on priorities attached, by using a protocol which controls quality of service in such a way as to avoid performance degradation in communication of high priority by dividing communications into classes and establishing an order of priorities.

Also, the present invention is implemented as a program which controls a computer to provide the functions of the contents providing system described above and causes the computer to execute processes corresponding to the steps in the contents transmission method described above. This program can be distributed in a magnetic disk, optical disk, semiconductor memory, or other recording medium, delivered via networks, and provided otherwise.

PREFERRED EMBODIMENT

The present invention will be described in detail below by way of embodiments shown in the accompanying drawings.

FIG. 1 is a diagram illustrating a schematic configuration of a network system according to this embodiment.

A network system to which the present invention is applied comprises a client 10 and contents provider 20 connected via a network 9 such as the Internet. Although one client 10 and one contents provider 20 are shown in the example of FIG. 1, actually a plurality of clients 10 and contents providers 20 can exchange data via the network 9. Incidentally, not all clients 10 and contents providers 20 necessarily consist of a single computer, but each of them may consist of a plurality of computers. It doesn't matter whether communications among components are wired or wireless.

In FIG. 1, the client 10 is implemented by an information terminal, such as a computer, cell phone, or PDA (personal digital assistant), equipped with an interface for connecting to the network 9.

As shown in FIG. 1, the client 10 comprises a user profile storage 11 for storing user profiles, an importance calculator 12 which calculates importance of contents to be acquired, and a contents reproducer 13 which transmits a playback command, a request for contents, to the contents provider 20 and plays back acquired contents. It also comprises an input device (not shown) for the user to enter data and commands.

The user profile storage 11 is implemented by a storage unit such as a RAM, other memory, or magnetic disk. The user profiles stored will be described later. The importance calculator 12 is implemented by a program-controlled CPU or the like. Importance will be described later. The contents reproducer 13 consists of playback control means which is implemented by a program-controlled CPU or the like and video/audio playback means such as a liquid crystal display, speaker, or the like.

The program which provides the above functions on the computer, information terminal, and the like (hereinafter referred generically as terminals) that implement the clients 10 can be provided via the network 9, by being preinstalled on the terminals, and so on.

The contents provider 20 is implemented by a computer, such as a workstation or personal computer, equipped with an interface for connecting to the network 9.

As shown in FIG. 1, the contents provider 20 comprises a contents server 21 which provides contents distributed to the client 10, hint information generator 22 which generates hint information attached to the contents, and contents transmission server 23 which controls transmission of the contents. The contents server 21 is implemented by a program-controlled CPU or the like and manages the contents it provides as well as metadata and a contents profile related to the contents. These data are stored in a storage unit such as a magnetic disk or optical disk mounted in the computer. According to this embodiment, the contents offered are data such as video and audio which vary with time when being played back, and are provided in an MP4 file compliant with the MPEG-4 file format. The metadata and contents profile will be described later. The hint information generator 22 is implemented by a program-controlled CPU or the like and serves as an information attaching means which generates hint information based on the user profile, the metadata, and the contents profile and attaches it to the contents. Details of the hint information will be described later. The contents transmission server 23 packetizes the contents stored in the contents server 21 and transmits the packets to the client 10.

The program which provides the above functions on the computer implementing the contents provider 20 can be provided in a magnetic disk, optical disk, or other recording medium.

Next, description will be given of data configuration which underlies data distribution according to this embodiment.

As shown in FIG. 1, the contents server 21 maintains the contents to be provided as well as the metadata and contents profile of the contents The metadata is created, for example, as a data file compliant with the MPEG-7 standard and contains index information on the contents.

FIG. 2 is a diagram showing an exemplary data configuration of metadata while FIG. 3 shows an example of contents indexes created using metadata.

Referring to FIG. 2, for each trigger action which identifies a predetermined event (a scene in video data or phrase in audio data) in contents, metadata consists of a set of trigger information which identifies the trigger action, trigger index information on the trigger action, and additional information on the trigger action. The trigger information contains a trigger action ID and trigger action name. The trigger index information contains the trigger action ID of the given trigger action, start time span and end time span of the given trigger action, and weight assigned to the given trigger action.

The start time span here means the time span from the position of the trigger action to the start of indexing while the end time span means the time span from the position of the trigger action to the end of indexing. These time spans are specified because depending on the event type identified by a trigger action, there are cases in which the process before the trigger action is important and cases in which the process after the trigger action is important. By setting the start time span longer in the former case and setting the end time span longer in the latter case, it is possible to make the index for the trigger action cover the corresponding event properly.

As a concrete example, FIG. 3 shows indexes for video contents of a soccer game. In this example, through-passes, corner kicks, and goals are shown as trigger actions. Also, a team name (information as to which team made a given play) is provided as additional information on each trigger action. Besides, the weight given to each index is expressed by a graph of a function. As shown in the figure, the weight given to an entire index is represented as a function using the weight of the trigger action described by metadata as well as the start time span and end time span.

Referring to the graphs of the functions which represent weighted indexes, they show an index that uses the through-pass, which is a type of pass, as a trigger action and an index that uses the pass as a trigger action. Also, since a trigger action in the form of a corner kick and a trigger action in the form of a goal are located close by, it is speculated that a goal was scored on the corner kick, a set play. Therefore, in order not to separate these scenes, a sequence of scenes from the corner kick to the goal (a goal from a corner) is assumed and the envelope of the graphs of the functions of the corner kick scene and the goal scene is used as a graph of a function of the sequence of scenes.

Thus, contents indexes which are provided as metadata can be created based on various rules depending on the type of contents.

FIG. 4 is a diagram showing an example of a contents profile. A contents profile contains a coefficient for calculating the importance of the events contained in the contents based on the weights given to the events. According to this embodiment, the importance is a factor in determining to what extent quality should be lowered when the quality of the contents is varied according to the traffic on the network 9. Specifically, the quality of the contents is controlled in such a way that the quality of less important parts is lowered greatly while the quality of important parts is not lowered so much.

In the example of the soccer game described above, it can easily be imagined how the importance of the same scene varies depending on the way the user watches the game: whether he/she supports team A, supports team B, or simply enjoys the game itself. Thus, a coefficient for calculating the importance of scenes is set based on an appropriate premise. In the example of FIG. 4, team names, trigger actions, and coefficient values are specified based on the example of the soccer game shown in FIG. 3. Incidentally, two or more contents profiles are generally created according to the type of contents and based on the premise described above (whether to support team A, support team B, enjoy the game itself, or the like).

Besides, as shown in FIG. 1, the client 10 maintains user profiles.

FIG. 5 is a diagram showing an example of a user profile.

A user profile contains a coefficient for calculating the importance of each event contained in contents based on the weight given to the event as is the case with contents profiles. Since the importance of scenes in contents depends heavily on tastes, preferences, etc. (hereinafter referred to collectively as preferences) of individual users, each client 10 creates and maintains user-specific user profiles to reflect the user preferences in the calculation of the importance of scenes.

Next, description will be given of a method for calculating the importance of scenes in contents using the contents profile and user profile.

FIG. 6 is a diagram illustrating how to calculate a coefficient (hereinafter referred to as the importance coefficient) for determining the importance of scenes using a contents profile and user profile.

FIG. 6 associates each scene (trigger action) in the example of the soccer game shown in FIG. 3 with values of the contents profile and user profile for the scene and a profile coefficient calculated from the values of the contents profile and user profile. According to this embodiment, the importance coefficient is calculated using the following equation.

Importance coefficient=α×contents profile+(1−α)× user profile

By selecting an appropriate value for α, it is possible to adjust the importance attached to the contents profile and user profile. The value of α may be specified either by the user or according to the contents. The example in the figure shows results calculated with α taken as 0.5 (α=0.5). Incidentally, the above equation is only an example of the formula for the importance coefficient, and a different equation may be used to calculate the importance coefficient.

FIG. 7 illustrates the importance of the scenes calculated using the importance coefficient shown in FIG. 6.

FIG. 7(A) shows the importance of the scenes shown in FIG. 6, as graphs of a function (f). As shown in the figure, the maximum values (the weight given to the trigger action in each scene) of the graphs of the function are used as the values of the importance coefficient for the corresponding scenes. The importance of contents at each time step is calculated using Formula 1.

[Formula 1]

$$f(t) = \max_{\text{for\_all\_i}} (f_i(t))$$

Thus, if scenes of multiple trigger actions overlap, the maximum value of the importance of the scenes at the same instant is used. FIG. 7(B) shows the contents' temporal importance calculated using the data shown in FIG. 7(A).

Next, description will be given of a method for controlling the quality of video contents using the contents' temporal importance calculated in the manner described above.

Regarding data file formats of contents, MPEG-4 Video (Simple Profile) format and MP4 file format are used according to this embodiment. MPEG-4 Video (Simple Profile) is encoded into two types of frame: an I (Intra coded) frame and P (Predictive coded) frame. I-frames are arranged periodically and used as starting points for random access or error recovery. They are encoded independently of other frames instead of using predictive coding. P-frames are predictively coded with reference to past I- or P-frames.

As described above, in contents indexes using metadata, importance is expressed as a function of time. Thus, in order to control the quality of video data in an MP4 file, it is necessary to convert temporal importance into frame-by-frame importance. The change of variable from time to frame is made using, for example, the following equation.

Frame=(frame/second)×time in seconds

FIG. 8 is a diagram which expresses importance of a certain segment in video as frame-by-frame importance.

By curtailing predetermined frames as appropriate from video contents organized into frame data, it is possible to reduce data size. Thus, this embodiment gives high priority to important frames and gives lower priority to less important frames based on the importance of each frame shown in FIG. 8, making it possible to discard less important packets depending to the traffic on the network 9.

In this case, parts where frames are lacking naturally suffer image degradation. Since importance is calculated in such a way as to reflect the contents type or user preferences as described above, important scenes in which the user is much interested suffer no image degradation while less important scenes in which the user is less interested suffer considerable image degradation. Since the scenes the user wants to watch (is much interested in) do not suffer image degradation, the user does not feel serious dissatisfaction.

In MPEG-4 Video (Simple Profile), one I-frame and a plurality of P-frame form a unit called GOV (Group of Video planes) (in the example of FIG. 8, one I-frame and three P-frames form a GOV). The P-frames in the GOV are predictively coded based on the I-frame.

Consequently, if frames are deleted simply based on the importance of individual frames, when I-frame is not important as is the case with GOV (1) and GOV (2) shown in FIG. 8, it is deleted and the P-frames in the same GOV cannot be decoded even if they are important.

Thus, this embodiment handles importance on a frame-by-frame basis so that the I-frame in each GOV that contains important frames will not be deleted.

FIG. 9 is a diagram illustrating such a technique for handling importance. The technique shown in FIG. 9 sets the importance of the I-frame in each GOV shown in FIG. 8 at that of the most important frame in the GOV. It sets the importance of the other frames at 0. When frames must be deleted, this technique makes it possible to retain the I-frame in the GOV which contains an important scene, avoiding a situation in which a portion of the image in the scene cannot be decoded.

FIG. 10 is a diagram illustrating another technique for handling frame-by-frame importance. The technique shown in FIG. 10 is similar to the technique shown in FIG. 9 in that it sets the importance of the I-frame in each GOV at that of the most important frame. In addition, it sets the importance of other frames stepwise. For example, if the importance of the I-frame after correction is Imp and a GOV interval is N, the i-th P-frame in the GOV is Imp×i/N.

In the example of FIG. 8, of the three P-frames composing one GOV, the importance of the first P-frame is ¾ the importance of the corrected I-frame, the importance of the second P-frame is 2/4 the importance of the corrected I-frame, and the importance of the third P-frame is ¼ the importance of the corrected I-frame. Therefore, if packets must be discarded as the traffic on the network 9 increases, the P-frames in the GOV are discarded in the order: the third, second, and first P-frames.

Handling of importance has been described above, citing a case in which a MPEG-4 video file is transmitted as contents, but it goes without saying that if data file in another file format is used as contents, necessary steps should be taken according to the file format. Whatever file format may be used, the importance of contents is determined first using the metadata, contents profile, and user profile provided for the contents. Then, if the data size of the contents is to be reduced according to the traffic on the network 9, this is done in accordance with the file format in such a way as to degrade data in less important part. Incidentally, the method for handling the importance of frames in MPEG-4 is not limited to the one described above.

Next, description will be given of operations involved in transmitting and receiving contents using the data structure and importance described above.

FIG. 11 is a diagram illustrating a flow of data in contents distribution operation according to this embodiment while FIG. 12 is a diagram illustrating a flow of processing between client 10 and contents provider 20.

Initially, the client 10 requests information on desired contents from the contents provider 20. In response, the contents server 21 of the contents provider 20 reads the metadata and contents profile related to the contents from the storage unit and transmits them to the client 10 (procedure 1-1). As the file format for this information, JAR (Java® Archive) is used, for example.

When the client 10 receives the metadata and contents profile from the contents provider 20, the importance calculator 12 calculates temporal importance of the contents (temporal importance information) using the received information and the user profile read out of the user profile storage 11 (procedure 1-2). The calculated temporal importance information is transmitted from the client 10 to the contents provider 20 (procedure 1-3).

When the contents provider 20 receives the temporal importance information from the client 10, the hint information generator 22 generates priorities based on the temporal importance information and attaches them as hint information to the contents.

Now, processes performed by the hint information generator 22 will be described.

The hint information generator 22 calculates correspondence between time and frames based on the frame rate of the contents and converts the temporal importance information into frame-by-frame importance (frame-by-frame importance information) (procedure 1-4). Then, it corrects the frame-by-frame importance information taking the frame type into consideration (procedure 1-5). Next, it maps the corrected frame-by-frame importance information to priority of each frame in the contents (procedure 1-6). Specifically, if RTP (Real-time Transport Protocol) is used in transmitting the contents and five priorities can be described in a RTP packet, hint information defined as follows is generated and attached to the contents (where P4, P3, P2, and P1 are predetermined constants).

Frames in the top P4% of importance: Priority 4
Frames in the top P4 to P3% of importance: Priority 3
Frames in the top P3 to P2% of importance: Priority 2
Frames in the top P2 to P1% of importance: Priority 1
Other frames: Priority 0

Once the frame-by-frame importance information is mapped to priorities as hint information in the manner described above, the hint information generator 22 attaches the generated hint information to the contents. The MP4 file which is the contents has a hint track for attaching information on contents (hint information). According to this embodiment, the priorities established in the manner described above can be written as hint information into the hint track. If a file type other than MP4 is used as contents, the data file may not contain a track for writing priorities. In such a case, a file can be created for priorities separate from the contents, stored in a predetermined storage unit, and attached to the packets which are generated when the contents are transmitted.

Next, the contents reproducer 13 of the client 10 sends a command to play back the contents (contents request) to the contents provider 20 (procedure 1-7). The playback command can be transmitted using RTSP (Real Time Streaming Protocol) or the like.

When the contents provider 20 receives the contents request from the client 10, the contents transmission server 23 converts the contents into prioritized RTP packets using the priorities contained in the hint information. Then, it transmits the RTP packets to the client 10 using DiffServ—a communications protocol which avoids performance degradation in communication of high priority by dividing communications into classes and establishing an order of priorities (procedure 1-8). Since a priority is attached to each RTP packet, communications bandwidth is allocated to the packet based on the priority depending on the traffic on the network 9. Since priorities are determined based on contents types and user preferences, communications bandwidth is allocated preferentially to high priority parts in which the user is much interested so that quality degradation of contents is avoided. On the other hand, a narrower bandwidth is allocated, as appropriate, to low priority parts in which the user is less interested as the traffic on the network 9 increases, resulting in quality degradation of contents.

If contents do not contain a track to write hint information into and priorities are maintained in a separate file, the priorities can be attached to the contents when it is packetized, provided the contents transmission server 23 has a capability to create prioritized packets based on the file containing priorities.

When the client 10 receives the RTP packets of the contents, the contents reproducer 13 plays back the acquired contents (procedure 1-9). A portion of the contents may have its quality degraded depending on the traffic on the network as described above, but the part whose quality is degraded is less important, meaning that the user is less interested in it. According to this embodiment, QoS is controlled based on the information (hint information) about priorities attached to the contents. These priorities have been established based on the importance calculated taking meaning of contents into consideration and reflect preferences of individual users. Thus, QoS control according to this embodiment avoids lowering user satisfaction even if a portion of contents degrades in its quality.

In the above description, importance is calculated and priorities are established and transmitted in relation to the entire contents the user (client 10) intends to acquire. On the other hand, the contents reproducer 13 of the client 10 can make a transmission request to the contents provider 20 by specifying predetermined segments of the contents and the contents provider 20 can transmit the contents by establishing the priority of these segments (video digest segment). In this case, the client 10 sets an importance threshold, using processing means implemented by a program-controlled CPU and based on the temporal importance information calculated by the importance calculator 12 according to procedure 1-2 described above, and identifies data segments whose importance exceeds the threshold. Then, when transmitting the temporal importance information according to procedure 1-3, the temporal importance information on the identified data segments (i.e., video digest segments) is transmitted. Here, in order for the user to get video of desired duration, the threshold is set such that the total duration of the data segments whose importance exceeds the threshold will be equal to the duration the user desires.

Next, another embodiment of the present invention will be described.

FIG. 13 is a diagram illustrating a schematic configuration of a network system according to this embodiment.

As shown in FIG. 13, according to this embodiment, the contents provider 20 is equipped, as a feature of the contents server 21, with an importance calculator 24 which calculates the importance of contents.

According to this embodiment, the importance calculator 24 calculates importance of contents based on the metadata and contents profile of the contents stored in a storage unit.

Other components of the contents provider 20 and client 10 are similar to those of the embodiment described earlier with reference to FIG. 1, and thus are denoted by the same reference numerals as the corresponding components in FIG. 1 and description thereof will be omitted.

FIG. 14 is a diagram illustrating a flow of data in contents distribution operation according to this embodiment while FIG. 15 is a diagram illustrating a flow of processing between client 10 and contents provider 20.

According to this embodiment, the contents server 21 of the contents provider 20 causes the importance calculator 24 to calculate frame-by-frame importance information using the corresponding metadata and contents profile before the client 10 accesses the contents provider 20 (procedure 2-0).

Initially, the client 10 requests information on desired contents from the contents provider 20. In response, the contents server 21 of the contents provider 20 reads the metadata and contents profile related to the contents from the storage unit and transmits them to the client 10 (procedure 2-1). As the file format for this information, JAR is used, for example.

Upon receiving the metadata and contents profile from the contents provider 20, the client 10 causes the importance calculator 12 to calculate temporal importance information of the contents using the received information and the user profile read out of the user profile storage 11 (procedure 2-2). Then, the client 10 extracts data segments of duration the user desires, using processing means implemented by a program-controlled CPU and based on the temporal importance information (procedure 2-3). Specifically, as described above, the client 10 identifies data segments whose importance exceeds a threshold which has been set such that the total duration of the data segments to be extracted will be equal to the desired duration and transmits segment information on the identified data segments (i.e., video digest segments) to the contents provider 20 (procedure 2-4).

According to this embodiment, the importance for determining priorities of contents is calculated using a contents profile owned by the contents provider 20 without consideration of a user profile. However, if video digest segments are specified based on the importance calculated with consideration of the user profile, information on user preferences will be taken into consideration to some extent. Naturally, the user may request entire contents without specifying video digest segments. In that case, the user profile is not reflected in priority setting.

As the contents provider 20 receives segment information on video digest segments from the client 10, the hint information generator 22 calculates correspondence between time and frames based on the frame rate of the contents to determine the frames which correspond to the video digest segments (procedure 2-5). Then, the hint information generator 22 extracts information on the frames which correspond to the video digest segments from the frame-by-frame importance information prepared according to procedure 2-0 (procedure 2-6). Next, it maps the extracted frame-by-frame importance information for the video digest segments to priorities of frames in the contents (procedure 2-7). The method for mapping priorities is similar to the one described with reference to FIGS. 11 and 12.

Once the hint information on priorities is generated in the manner described above and attached to the contents, the client 10 sends a command to play back the contents to the contents provider 20 using RTSP (procedure 2-8). Then, the contents transmission server 23 converts the data in the video digest segments of the contents into prioritized RTP packets using the priorities contained in the hint information. Then, it transmits the RTP packets to the client 10 using DiffServ (procedure 2-9).

When the client 10 receives the RTP packets of the contents, the contents reproducer 13 plays back the acquired contents (procedure 2-10). A portion of the acquired contents may have its quality degraded depending on the traffic on the network 9, but the part whose quality is degraded is less important, meaning that the user is less interested in it, and thus user satisfaction will not be affected significantly.

According to this embodiment, since frame-by-frame importance information is prepared in advance regardless of whether there is access from the client 10, burdens on the contents provider 20 are lighter than in the case where frame-by-frame importance information is prepared promptly using the temporal importance information received from the client 10.

This embodiment does not use a user profile to prepare frame-by-frame importance information, but depending on the type of contents, a sufficient variety of contents profiles can be prepared with consideration of user preferences. Besides, if video digest segments are specified as described above, a user profile is used in the process of selecting the video digest segments, and thus user preferences are reflected to some extent.

Next, still another embodiment of the present invention will be described.

FIG. 16 is a diagram illustrating a schematic configuration of a network system according to this embodiment.

As shown in FIG. 16, according to this embodiment the contents provider 20 is equipped, as a feature of the contents server 21, with an importance calculator 24 which calculates the importance of contents.

According to this embodiment, the importance calculator 24 calculates importance of contents based on the metadata and contents profile of the contents stored in a storage unit. Other components of the contents provider 20 and client 10 are similar to those of the embodiment described earlier with reference to FIG. 1, and thus are denoted by the same reference numerals as the corresponding components in FIG. 1 and description thereof will be omitted.

FIG. 17 is a diagram illustrating a flow of data in contents distribution operation according to this embodiment while FIG. 18 is a diagram illustrating a flow of processing between client 10 and contents provider 20.

According to this embodiment, the contents server 21 of the contents provider 20 causes the importance calculator 24 to calculate frame-by-frame importance information using the corresponding metadata and contents profile even before the client 10 accesses the contents provider 20. Also, it determines priorities based on the calculated frame-by-frame importance information and attaches them as hint information to the contents in advance (procedure 3-0).

Initially, the client 10 requests information on desired contents from the contents provider 20. In response, the contents provider 20 reads the metadata and contents profile related to the contents from the contents server 21 and transmits them to the client 10 (procedure 3-1). As the file format for this information, JAR is used, for example.

Upon receiving the metadata and contents profile from the contents provider 20, the client 10 causes the importance calculator 12 to calculate temporal importance information of the contents using the received information and the user profile read out of the user profile storage 11 (procedure 3-2). Then, the client 10 extracts data segments of duration the user desires, using processing means implemented by a program-controlled CPU and based on the acquired temporal importance information (procedure 3-3). Specifically, as described above, the client 10 identifies data segments whose importance exceeds a threshold which has been set such that the total duration of the data segments to be extracted will be equal to the desired duration and transmits a command to play back the identified data segments, i.e., video digest segments, to the contents provider 20 using RTSP or the like (procedure 3-4).

When the contents provider 20 receives the playback command, the contents transmission server 23 converts the data in the video digest segments of the contents into prioritized RTP packets using the priorities contained in the hint information. Then, it transmits the RTP packets to the client 10 using DiffServ (procedure 3-5).

When the client 10 receives the RTP packets of the contents, the contents reproducer 13 plays back the acquired contents (procedure 3-6). A portion of the acquired contents may have its quality degraded depending on the traffic on the network 9, but the part whose quality is degraded is less important, meaning that the user is less interested in it, and thus user satisfaction will not be affected significantly.

According to this embodiment, since priorities of frames in the contents are determined and attached as hint information to the contents in advance regardless of whether there is access from the client 10, it only remains to extract predetermined segments from the contents to which the hint information has been attached and send them back in response to the playback command from the client 10. Thus, burdens on the contents provider 20 are lighter than in the case where frame-by-frame importance information is prepared promptly using the temporal importance information received from the client 10.

This embodiment does not use a user profile to determine priorities, but depending on the type of contents, a sufficient variety of contents profiles can be prepared with consideration of user preferences. Besides, if video digest segments are specified as described above, a user profile is used in the process of selecting the video digest segments, and thus user preferences are reflected to some extent.

ADVANTAGES OF THE INVENTION

As described above, the present invention can implement more appropriate QoS control by taking meaning of contents into consideration when discarding data distributed in contents distribution on a network.

Also, the present invention can implement QoS control which accommodates contents users individually by taking contents users' demands into consideration when discarding distributed data.

BRIEF DESCRIPTION OF THE DRAWINGS

FIG. 1 is a diagram illustrating a schematic configuration of a network system according to one embodiment of the present invention;

FIG. 2 is a diagram showing an exemplary data configuration of metadata used in this embodiment;

FIG. 3 is a diagram showing an example of contents indexes created using metadata;

FIG. 4 is a diagram showing an example of a contents profile used in this embodiment;

FIG. 5 is a diagram showing an example of a user profile used in this embodiment;

FIG. 6 is a diagram illustrating how to calculate an importance coefficient of scenes using a contents profile and user profile according to this embodiment;

FIG. 7 is a diagram illustrating the importance of scenes calculated using the importance coefficient shown in FIG. 6;

FIG. 8 is a diagram expressing importance of a certain segment in video as frame-by-frame importance;

FIG. 9 is a diagram illustrating a technique for handling importance taking frame types into consideration;

FIG. 10 is a diagram illustrating another technique for handling importance by taking frame types into consideration;

FIG. 11 is a diagram illustrating a flow of data in contents distribution operation according to this embodiment;

FIG. 12 is a diagram illustrating a flow of processing between client and contents provider according to this embodiment;

FIG. 13 is a diagram illustrating a schematic configuration of a network system according to another embodiment of the present invention;

FIG. 14 is a diagram illustrating a flow of data in contents distribution operation according to this embodiment;

FIG. 15 is a diagram illustrating a flow of processing between client and contents provider according to this embodiment;

FIG. 16 is a diagram illustrating a schematic configuration of a network system according to still another embodiment of the present invention;

FIG. 17 is a diagram illustrating a flow of data in contents distribution operation according to this embodiment; and FIG. 18 is a diagram illustrating a flow of processing between client and contents provider according to this embodiment.

DESCRIPTION OF SYMBOLS

10 . . . Client
11 . . . User profile storage
12, 24 . . . Importance calculator
13 . . . Contents reproducer
20 . . . Contents provider
21 . . . Contents server
22 . . . Hint information generator
23 . . . Contents transmission server

The invention claimed is:

1. A contents transmission method for controlling a computer connected to a network to transmit contents, comprising the steps of:
generating information on communication priorities based on the contents' importance which is determined by meaning of the contents and attaching it to the contents; and
transmitting said contents, with said information on priorities attached, by using a transmission protocol which dynamically controls quality of service in such a way as to avoid performance degradation in communication of high priority content by dividing communications into classes and establishing an order of priorities; further comprising a step of calculating said importance, based on metadata which describes information comprising contents profiles on said contents and user profiles which describe values relating to the importance of the contents corresponding to the metadata, using the formula:

$$\text{Importance} = \alpha \times \text{contents profile} + (1-\alpha) \times \text{user profile},$$

where $\alpha$ is a predetermined weighting value.

2. A recording medium on which a program for transmitting contents by controlling a computer connected to a network is stored in a form readable by said computer, wherein said program causes said computer to execute:
- a first process for generating information on communication priorities based on the contents' importance which is determined by meaning of the contents and attaching it to the contents; and
- a second process for transmitting said contents, with said information on priorities attached, by using a protocol which dynamically controls quality of service in such a way as to avoid performance degradation in communication of high priority content by dividing communications into classes and establishing an order of priorities; wherein said program further causes said computer to execute a third process for transmitting metadata which describes information on said contents and a contents profile which describes values relating to the importance of the contents corresponding to the metadata to said client to which said contents are transmitted and receiving said importance calculated by using the metadata and contents profile and user profiles, wherein importance is calculated using the formula:

$$\text{Importance} = \alpha \times \text{contents profile} + (1-\alpha) \times \text{user profile},$$

where $\alpha$ is a predetermined weighting value, and wherein said first process generates said information on priorities using said importance acquired in said third process.

3. The medium of claim 2, wherein if said contents are video contents, said first process generates information on priority for each frame in the video contents according to scenes in the video contents.

* * * * *